(12) United States Patent
Hirai

(10) Patent No.: US 8,773,576 B2
(45) Date of Patent: Jul. 8, 2014

(54) IMAGE PICKUP SYSTEM, INCLUDING MEASURING UNIT

(75) Inventor: Yuusuke Hirai, Saitama (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/549,662

(22) Filed: Jul. 16, 2012

(65) Prior Publication Data

US 2013/0021518 A1  Jan. 24, 2013

(30) Foreign Application Priority Data

Jul. 21, 2011 (JP) ................................ 2011-159871

(51) Int. Cl.
*G03B 13/00* (2006.01)
*H04N 5/232* (2006.01)

(52) U.S. Cl.
USPC ...................................... 348/357; 348/208.14

(58) Field of Classification Search
USPC ................. 348/207.1, 208.14, 211.1–211.11, 348/222.1, 357
See application file for complete search history.

(56) References Cited

U.S. PATENT DOCUMENTS

| 8,508,595 B2 * | 8/2013 | An ............................ 348/208.14 |
| 2002/0191076 A1 * | 12/2002 | Wada et al. .................... 348/143 |
| 2003/0021598 A1 * | 1/2003 | Higashiyama et al. .......... 396/18 |
| 2004/0096084 A1 * | 5/2004 | Tamoto et al. ................. 348/143 |
| 2006/0104625 A1 * | 5/2006 | Oya .............................. 396/153 |

FOREIGN PATENT DOCUMENTS

JP  9205573 A  8/1997

* cited by examiner

*Primary Examiner* — Gevell Selby
(74) *Attorney, Agent, or Firm* — Rossi, Kimms & McDowell, LLP

(57) ABSTRACT

An image pickup system includes: an optical system including a focus lens unit; a camera platform apparatus driving the optical system to pan and tilt; a measuring unit measuring a distance to an object, the measuring unit operable to be driven independently from the pan/tilt-driving of the optical system; and a controller storing panning/tilting positions of the optical system as pre-set positions, and controls driving of the optical system to the pre-set positions, wherein upon input of a drive command for driving the optical system to the stored pre-set positions, the controller drives the measuring unit so that a panning position of the measuring unit and the stored panning position correspond to each other and starts measurement by the measuring unit before completion of the driving of the optical system to the stored panning/tilting positions.

11 Claims, 3 Drawing Sheets

IMAGE PICKUP SYSTEM, INCLUDING MEASURING UNIT

BACKGROUND OF THE INVENTION

1. Field of the Invention

The present invention relates to an image pickup system including a camera platform apparatus, and specifically relates to an image pickup system having a function that stores panning/tilting positions of a camera platform apparatus and drives the camera platform apparatus to the stored panning/tilting positions.

2. Description of the Related Art

Conventionally, camera platform apparatuses that pan/tilt using remote control from a remote operation apparatus in image pickup systems including an autofocusing unit have been known.

For autofocusing when a camera platform apparatus is used, an arbitrary area of an image pickup screen is made to a region subject to autofocusing, and an image pickup lens for focusing is driven according to a distance to an object in the region. Then, upon the camera platform apparatus being panned/tilted, the object on camera is changed from one to another and the focus state changes, and thus, the autofocusing unit sets a focus value again.

Autofocusing here means contrast AF or phase-difference AF. Contrast AF is a method in which focusing is performed by controlling an image pickup optical system based on the magnitude of a high-frequency component of an output signal obtained from an image sensor. Phase-difference AF is a method in which a distance to an object is measured using the principle of triangulation using two sensors.

Also, remote operation apparatuses have a preset function. The preset function registers, e.g., panning/tilting target positions desired by an operator and a target position for a focus value in a storage unit as a preset position. Then, the operator gives an instruction to reproduce the preset position, driving is performed so that the panning/tilting positions and the focus value reach the respective target positions. Hereinafter, an operation in which an instruction to reproduce a preset position is input, driving is performed so as to drive to the target positions and the target positions are reached is referred to as a shot operation.

For example, Japanese Patent Application Laid-Open No. H09-205573 describes a method for controlling autofocusing when a camera platform apparatus including a camera lens is subject to the pan/tilt operation.

In Japanese Patent Application Laid-Open No. H09-205573, immediately after provision of an instruction to reproduce a preset position using a preset function of a remote operation apparatus, a focus lens unit is instantly driven to a target position and panning/tilting operation is performed to the panning/tiling target positions. Then, upon the target positions being reached, an autofocusing function is activated to perform focusing on a true image pickup position.

During panning/tilting, the object is sequentially changed from one to another, resulting in instability of a focal position of a focus lens unit. Therefore, in the above technique, autofocus operation is not performed during panning/tilting rotation and the focus lens unit is instantly driven to a target position so as to prevent the focusing operation during panning/titling from becoming unstable. Also, the autofocusing function is activated after reaching the target positions to prevent from providing an out-of-focus image because an object registered via the preset function and an object after a shot operation may be different from each other.

However, the aforementioned conventional technique disclosed in Japanese Patent Application Laid-Open No. H09-205573 has the following problems. First, in a shot function in which the panning/tilting positions and the conditions such as focusing and zooming of an optical system are forcibly driven to preset conditions, if an object distance registered via a preset function and an object distance after the shot operation are different from each other, an out-of-focus image of the object is obtained until the camera returns to an autofocusing state and performs focusing using autofocusing after the shot operation. Also, during panning/tilting operation to the target panning/tilting positions using a shot function, autofocusing does not work, and thus, an image picked up during the rotation is highly likely blurred. As described above, it is highly likely that an image is blurred after and during a shot operation, resulting in the image providing a feeling of strangeness.

SUMMARY OF THE INVENTION

Therefore, an object of the present invention is to provide an image pickup system that can perform less-blurred focusing on an object in the optical axis direction of the image pickup optical system at target positions (a panning position and a tilting position of the image pickup optical system stored in a controller) during a shot operation to provide an image providing a reduced feeling of strangeness.

In order to achieve the above object, an image pickup system according to the present invention includes: an image pickup optical system including a focus lens unit; a camera platform apparatus that drives the image pickup optical system to pan and tilt; a measuring unit that measures a distance to an object, the measuring unit being operable to be driven independently from the pan-driving and tilt-driving of the image pickup optical system; and a controller that stores a panning position and a tilting position of the image pickup optical system as pre-set positions, and controls driving of the image pickup optical system to the pre-set positions, wherein upon input of a drive command for driving the image pickup optical system to the stored pre-set positions, the controller drives the measuring unit so that a panning position of the measuring unit and the stored panning position correspond to each other and starts measurement by the measuring unit before completion of the driving of the image pickup optical system to the stored panning position and the stored tilting position.

According to the present invention, an image pickup system measures a distance to an object in an optical axis direction of the image pickup optical system at a panning position and a tilting position stored in a controller or a focus condition of the image pickup optical system with respect to the object before completion of driving to a panning position and a tilting position (panning/tilting positions) of the image pickup optical system stored in the controller. Accordingly, an image pickup system according to the present invention can perform focusing on an object in the optical axis direction of the image pickup optical system at target positions (panning/tilting positions of the image pickup optical system stored in the controller) with less defocusing during a shot operation to provide a clear image providing a reduced feeling of strangeness.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Embodiment 1

Figure 1:
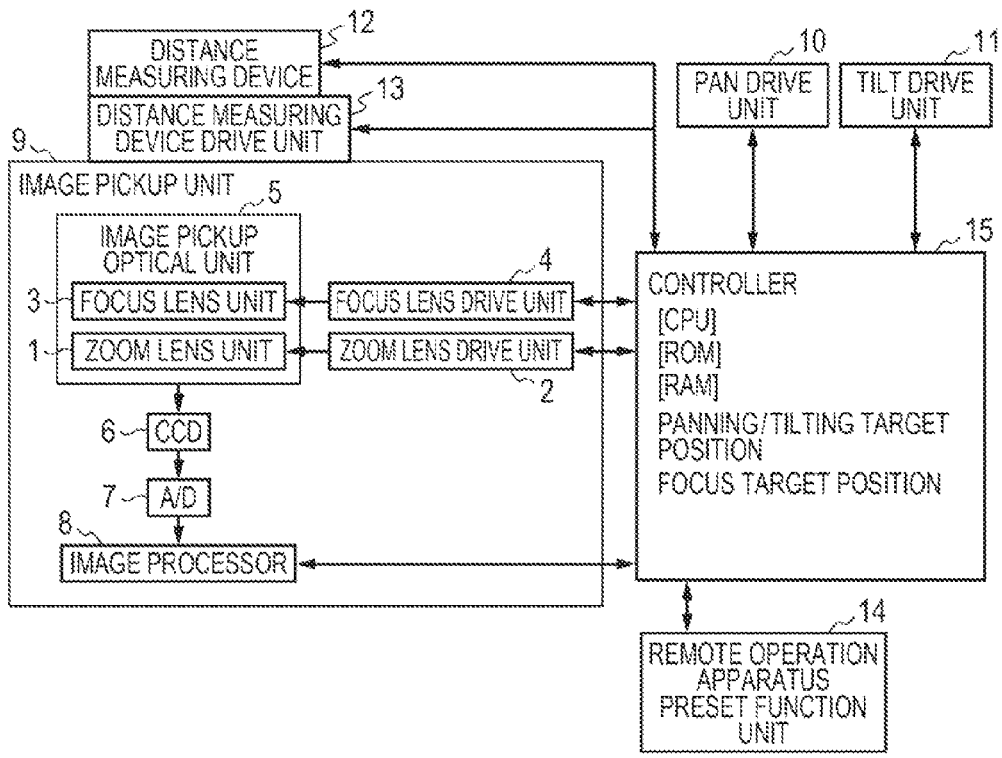
FIG. 1 is a diagram of a system configuration of a camera platform apparatus according to embodiment 1 of the present invention.
Figure 2:
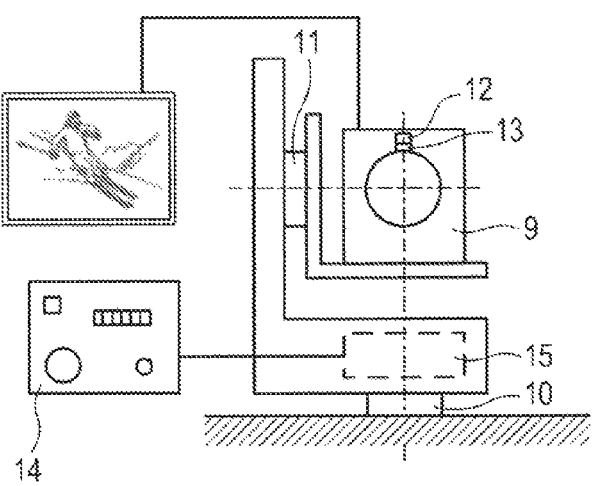
FIG. 2 is a diagram of an outer appearance of the camera platform apparatus according to embodiment 1 of the present invention.

Hereinafter, a first embodiment of the present invention will be described with reference to FIGS. 1 and 2. First, a configuration of an image pickup system, which is illustrated in FIG. 1, will be described.

An image pickup system according to the present embodiment includes: an image pickup unit 9 including an image-pickup optical unit (image pickup optical system) 5 including a zoom lens unit 1 for changing a magnification for image pickup and a focus lens unit 3 for focus adjustment and an image sensor 6 such as a CCD (hereinafter referred to as CCD 6) that photoelectrically converts an image of an object picked up by the image-pickup optical unit 5 to an image signal; a pan drive unit 10 that drives the image pickup unit 9 to pan; a tilt drive unit 11 that drives the image pickup unit 9 to tilt; a controller 15 that controls driving of the entire image pickup system; and a remote operation apparatus 14 that is connected to the controller 15 and remotely operates the image pickup unit 9, the pan drive unit 10 and tilt drive unit 11.

The image pickup unit 9 includes a zoom drive unit 2 that upon receipt of a command signal from the controller 15, drives the zoom lens unit 1, and a focus drive unit 4 that upon receipt of a command signal from the controller 15, drives the focus lens unit 3. The zoom drive unit 2, which includes an encoder and a potentiometer, transmits zoom position information to the controller 15. The focus drive unit 4, which includes an encoder and a potentiometer, transmits focus position information to the controller 15.

The image-pickup optical unit 5 further includes, e.g., an iris and a filter switchover mechanism, which are not illustrated. The image pickup unit 9 includes an A/D converter circuit 7 that coverts an analog image signal resulting from photoelectric conversion performed by the CCD 6 into a digital image signal, and an image processor 8 that adjusts, e.g., color and/or tone of the digital image signal obtained from the A/D converter circuit 7. Also, the image processor 8 calculates an evaluation value based on a magnitude of a high-frequency component of the output signal obtained from the CCD 6 and outputs the evaluation value to the controller 15. The controller 15 outputs a command signal for controlling the focus lens unit 3 to the focus drive unit 4 based on the input evaluation value. Thus, the image processor 8 has a hill-climbing contrast AF function.

Hereinafter, an area inside an angle-of-view range of an image picked up by the image pickup unit 9 is referred to as an area inside an image pickup screen, and an area outside the angle-of-view range of the image picked up by the image pickup unit 9 is referred to as an area outside the image pickup screen.

The pan drive unit 10 detects panning speed information and panning position information and transmits the panning speed information and the panning position information to the controller 15. As illustrated in FIG. 2, upon the pan drive unit 10 rotates for panning, the image pickup unit 9, the controller 15, the tilt drive unit 11, and a distance measuring device 12 and a distance measuring device drive unit 13, which will be described later, rotate.

The tilt drive unit 11 detects tilting speed information and tilting position information and transmits the tilting speed information and the tilting position information to the controller 15. As illustrated in FIG. 2, upon the tilt drive unit 11 rotates for tilting, the image pickup unit 9, the distance measuring device 12 and the distance measuring device drive unit 13 rotate.

The distance measuring device drive unit 13 is fixed to the image pickup unit 9. The distance measuring device drive unit 13 rotates the distance measuring device 12, which have a phase-difference AF function that measures a distance to an object, to pan/tilt. The distance measuring device (measuring unit) 12 includes at least one pair of line sensors for measuring and calculating a defocus amount, separately from the CCD 6 for image pickup. A result of the calculation is transmitted to the controller 15, and the controller 15 drives the focus lens unit 3 according to the defocus amount, thereby performing focusing. The distance measuring device drive unit 13 can rotate independently from the pan drive unit 10 and the tilt drive unit 11. The distance measuring device drive unit 13 rotates in response to a command signal from the controller 15. The distance measuring device drive unit 13, which includes an encoder and a potentiometer, transmits panning position information and tilting position information on the distance measuring device 12 to the controller 15.

Upon an operator operating the remote operation apparatus 14, command signals for driving, e.g., the zoom lens unit 1, the focus lens unit 3, the pan drive unit 10 and the tilt drive unit 11 are transmitted to the controller 15, whereby, e.g., the zoom lens unit 1, the focus lens unit 3, the pan drive unit 10 and the tilt drive unit 11 can remotely be operated. The command signals transmitted from the remote operation apparatus 14 to the controller 15 are classified into two types of signals, i.e., speed command signals and position command signals. The speed command signals are command signals for designating a rotation speed for panning/tilting and/or a drive speed for, e.g., zoom lens unit according to an amount of operation of a joystick and/or a zoom lever provided in the remote operation apparatus 14. The position command signals are signals for providing an instruction to drive the zoom lens unit 1, the focus lens unit 3 and/or the image pickup unit 9 to positions such as a zoon position, a focus position, a panning position and a tilting position stored in advance in a RAM, which is a storage unit in the controller 15, as preset positions, the position command signals being provided by an operator using a preset function unit included in the remote operation apparatus 14 (drive commands for driving the zoom lens unit 1, the focus lens unit 3 and the image pickup unit 9 to preset positions). Hereinafter, focus position information stored in the RAM in the controller 15 using operation of the preset function unit in the remote operation apparatus 14 are referred to as a focus target position, and panning position information and tilting position information stored in a same manner as above are collectively referred to as panning/tilting target positions.

The controller 15 includes a CPU, a ROM and the RAM. The RAM stores a focus target position and panning/tilting target positions using operation of the preset function unit in the remote operation apparatus 14 as preset positions. The storing is executed in response to a store command, which is output from the remote operation apparatus 14 to the controller 15, for commanding to store a focus target position and panning/tilting target positions. The controller 15 includes a preset controller. Upon input of a position command signal from the remote operation apparatus 14, the preset controller executes a program stored in the ROM to control to drive, e.g., the pan drive unit 10, the tilt drive unit 11, the focus drive unit 4 and the zoom drive unit 2 to the panning/tilting target positions and the focus target position (preset positions) stored in the RAM.

A case where there is no position command signal is input from the remote operation apparatus 14 to the controller 15 will be described. In this case, the distance measuring device drive unit 13 does not rotate for panning/tilting. When no position command signal is input, a command signal is transmitted from the controller 15 to the distance measuring device drive unit 13 to control the distance measuring device drive unit 13 so that a panning position of the distance measuring device 12 corresponds to a panning position of the image pickup unit 9. The distance measuring device 12 includes one pair of line sensors, and measures a distance to an object at fixed time intervals and outputs the measured distance value to the controller 15. The controller 15 controls autofocusing of the image pickup unit 9 based on the measured distance value.

Figure 3:
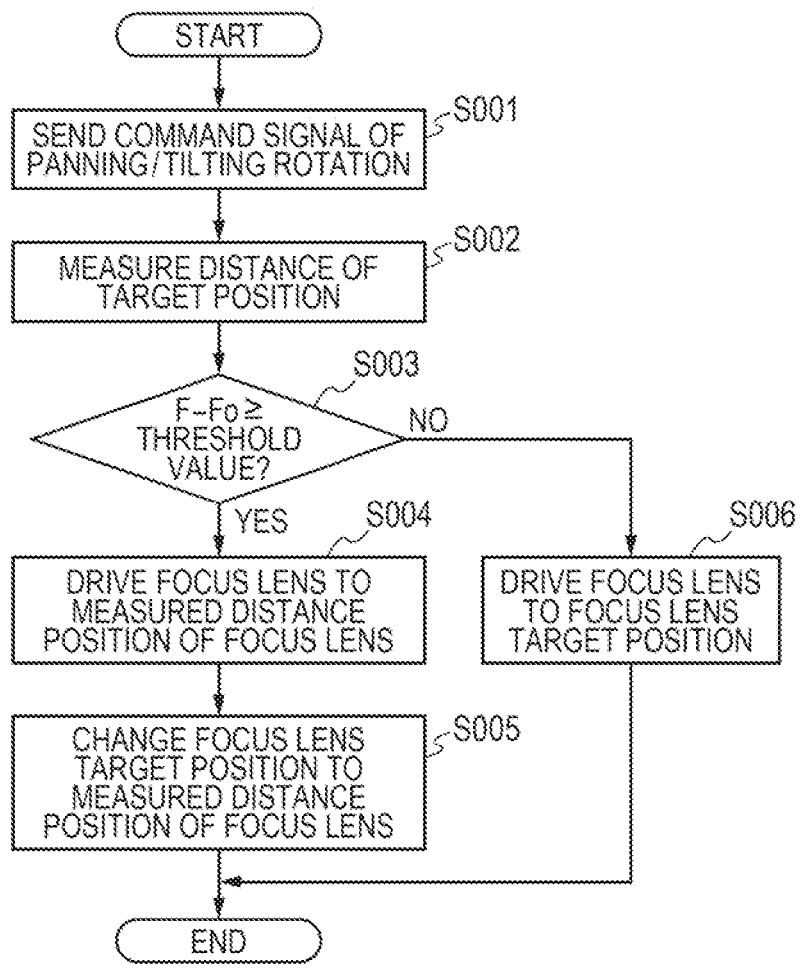
FIG. 3 is a flowchart of processing performed by a controller according to embodiment 1 of the present invention.

Next, the flow of processing performed by the controller 15 will be described with reference to FIG. 3.

In step S001, a command for driving to preset positions, that is, a position command signal for panning/tilting target positions and a focus target position, is input from the preset function unit in the remote operation apparatus 14 to the controller 15. The controller 15 transmits command signals to the pan drive unit 10 and the tilt drive unit 11 based on the position command signal so as to drive the pan drive unit 10 and the tilt drive unit 11 to panning/tilting target positions stored in the RAM in the controller 15.

Before the panning/tilting positions of the image pickup optical unit 5 reach the panning/tilting target positions (preset positions with respect to the panning/tilting positions), the panning position of the distance measuring device 12 reaches the panning position which is the panning position of the panning/tilting target positions. Once the panning position of the distance measuring device 12 corresponds to the panning position of the panning/tilting target positions, the distance measuring device drive unit 13 controls driving of itself so that the panning position of the distance measuring device 12 remains at the panning position of the panning/tilting target positions. The processing moves to step S002.

In step S002, the distance measuring device 12 perform distance measurement with respect to an object in the optical axis direction of the image pickup optical unit 5 at the panning/tilting target positions and transmits a measured distance value to the controller 15. The controller 15 converts the measured distance value to a focus command position (position of the focus lens unit based on the distance to an object in the optical axis direction of the image pickup optical unit 5 at the panning/tilting target positions measured by the distance measuring device 12 that have been driven to the panning position of the panning/tilting target positions). Hereinafter, a focus command position provided by the distance measuring device 12 is referred to as "measured-distance-based focus position". The processing moves to step S003.

In step S003, a difference between a value of the focus target position (preset position with respect to the focus position) and a value of the measured-distance-based focus position (focus difference value) is calculated by the controller 15. In a case where the focus difference value is no less than a threshold value, the processing proceeds to step S004, and in a case where the focus difference value is less than the threshold value, the processing proceeds to step S006.

In step S003, whether or not there is a large difference between a distance to the object stored by operation of the preset function unit and a distance to the object after a shot operation is executed. If the focus difference value is no less than the threshold value, an object in an image, which is intended by an operator, is changed to another, and thus, if focusing is performed on the focus target position, it is highly likely that the object in the image is largely blurred. Accordingly, autofocusing is performed based on the value of the measured-distance-based focus position provided by the distance measuring device 12 in preference to the value of the focus target position stored in advance by the operator operating the preset function unit.

In step S004, a command signal is transmitted from the controller 15 to the focus drive unit 4 to control to drive the focus lens unit 3 to the measured-distance-based focus position, and the processing moves to the step S005.

In step S005, the value of the focus target position stored in the controller 15 is changed to the measured distance position of the focus lens unit. The change eliminates the need for the operator to re-register a preset.

In step S006, a command signal is transmitted from the controller 15 to the focus drive unit 4 so as to control to drive the focus lens unit 3 to the focus target position.

Steps S001 to S006 described above are included in the flow of processing performed by the controller 15 according to embodiment 1. According to the flow of processing, before panning/tilting positions of the image pickup unit 9 reach panning/tilting target positions (before completion of driving of the image-pickup optical unit 5 to the panning/tilting target positions), the distance measuring device 12 performs distance measurement with respect to an object in the optical axis direction of the image pickup optical unit 5 at the panning/tilting target positions and a preset focus position (focus target position) and a focus position based on the measured distance value (measured-distance-based focus position) are compared, enabling prevention of an object in an image from being largely blurred. If the distance measuring device 12 performs distance measurement with respect to an object in the optical axis direction of the image pickup optical unit at the panning/tilting target positions, a tilting position of the distance measuring unit 12 may take an arbitrary position as far as the tilting position of the distance measuring unit takes a position at which the optical axis of the distance measuring unit 12 is parallel to the optical axis of the image pickup optical unit 5 at the panning/tilting target position, or at which a projection of the optical axis of the distance measuring unit 12 onto a plane in which the optical axis of the image pickup optical unit 5 at the panning target position would change its direction due to the tilting, intersects with the optical axis of the image pickup optical unit 5 at the panning/tilting target position on the object side.

Although in the above description, autofocusing is performed by distance measurement using one pair of line sensors, multiple-point distance measurement may be performed using a plurality of line sensors. Then, it is possible that values of a plurality of the distance measuring points are averaged based on a value of a focal length and autofocusing is performed based on the averaged measured distance value. For example, if the value of the focal length is a wide-angle value, autofocusing may be performed by averaging the measured distance values of the plurality of distance measuring points in the distance measuring device 12. If the value of the focal length is a telephoto-side value, autofocusing may be performed based on the measured distance value of one distance measuring point at an optical axis direction of the distance measuring device 12.

Figure 4:
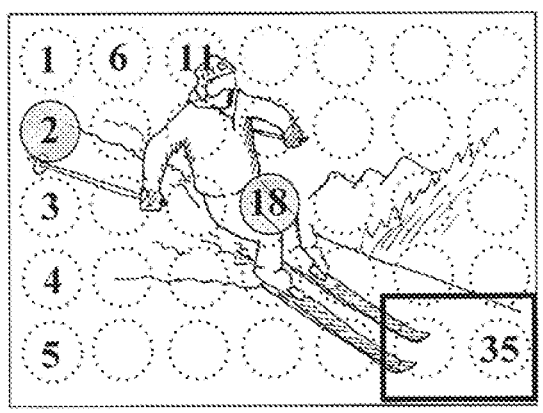
FIG. 4 is a diagram illustrating multiple distance measuring points on an image pickup screen according to embodiment 1 of the present invention.

The distance measuring device (measuring unit) 12, which is rotated by the distance measuring device drive unit 13, rotates independently from the pan drive unit 10 and the tilt drive unit 11 in the camera platform apparatus (in other words, the distance measuring unit 12 is operable to be driven independently from the pan-driving and tilt-driving of the image pickup optical unit), and thus, can perform distance measurement of an area inside the image pickup screen and an area outside the image pickup screen to perform autofocusing. For another control method, when the panning/tilting target positions are within the image pickup screen, autofocusing may be performed by a non-illustrated multiple-point distance measuring device provided in the image pickup unit 9 (integrally provided with the image pickup optical unit). As illustrated in FIG. 4, the multiple-point distance measuring device is a distance measuring device (measuring unit) that can perform distance measurement for each of areas into which the image pickup screen is divided. FIG. 4 illustrates an example in which the image pickup screen is divided into 35 areas. For example, where an optical axis direction of the image pickup optical system 5 at panning/tilting target positions is a direction of No. 2 in FIG. 4, the multiple-point distance measuring device performs distance measurement of an area in the vicinity of the area of No. 2, and subsequently, the processing moves to step S003 in the flow of processing described above.

Focus state of the image pickup optical unit 5 with respect to an object may be used as a result of the measurement of the multiple-point distance measuring device in place of the distance to the object. The focus state can be expressed by, for example, defocus amount.

The processing in step S002 (distance measurement performed by the distance measuring device 12) only needs to be started at least before completion of driving the image-pickup optical unit 5 to the panning/tilting target positions. Consequently, when the driving of the image-pickup optical unit 5 to the panning/tilting target positions has been completed, distance measurement performed by the distance measuring device 12 has already been started, and thus, time required for distance measurement by the distance measuring device 12 after the completion of the driving of the image-pickup optical unit 5 to the panning/tilting target positions can be reduced. Also, the processing in step S002 (distance measurement by the distance measuring device 12) can be completed before the completion of the driving of the image-pickup optical unit 5 to the panning/tilting target positions. This is because in such case, the distance measurement by the distance measuring device 12 has already been completed when the driving of the image-pickup optical unit 5 to the panning/tilting target positions is completed, requiring no time for distance measurement by the distance measuring device 12 after completion of the driving of the image-pickup optical unit 5 into the panning/tilting target positions.

It is favorable that the processing in step S004 (driving of the focus lens unit to the measured-distance-based focus position of the focus lens unit) and the processing in step S006 (driving of the focus lens unit to the focus target position) are completed before completion of the driving of the image-pickup optical unit 5 to the panning/tilting target positions. This is because the driving of the focus lens unit to the measured distance position of the focus lens unit and the focus target position is completed before the driving of the image-pickup optical unit 5 to the panning/tilting target positions is completed, and thus, an in-focus state for the object is obtained simultaneously with the completion of the driving of the image-pickup optical unit 5 to the panning/tilting target positions.

Although the above description has been given in terms of a case where autofocusing is performed through phase-difference AF by use of the distance measuring device 12, autofocusing may be performed through contrast AF by use of the image processor 8. In the case of contrast AF, when an optical axis direction of the image pickup optical unit 5 at a panning/tilting target position is displayed on an image pickup screen, an area in the vicinity of the optical axis direction is set as a contrast AF area to perform contrast AF. For example, if the area of No. 35 in FIG. 4 is the optical axis direction of the image pickup optical unit 5 at the panning/tilting target position, the area in the rectangular solid line frame is set as a contrast AF area to perform autofocusing.

Also, a setting section which enables selection of turning on or off the control for the distance measuring device 12 to measure a distance to an object in an optical axis direction of the image pickup optical unit 5 at the panning/tilting target position, at a panning position different from a current panning position of the image pickup unit 9 to perform autofocus based on such measured distance value (result of the measurement of the distance to the object) may be provided in the remote operation apparatus 14. In other words, if the setting section is in an on state, upon input of a command for driving the image pickup unit 9 to a preset position, the focus lens unit in the image pickup optical system is driven to a focus position based on the measured distance value measured by the distance measuring device 12. If the setting section is in an off state, the focus lens unit in the image pickup optical system is driven based on the focus position stored as a preset position (focus target position).

The image pickup system according to embodiment 1 provides an effect of providing a less-blurred, clear image of an object in an optical axis direction of the image pickup optical unit 5 at the panning/tilting positions stored in advance even immediately after the image pickup optical unit 5 is subject to a panning/tilting driving by the preset function.

Embodiment 2

Figure 5:
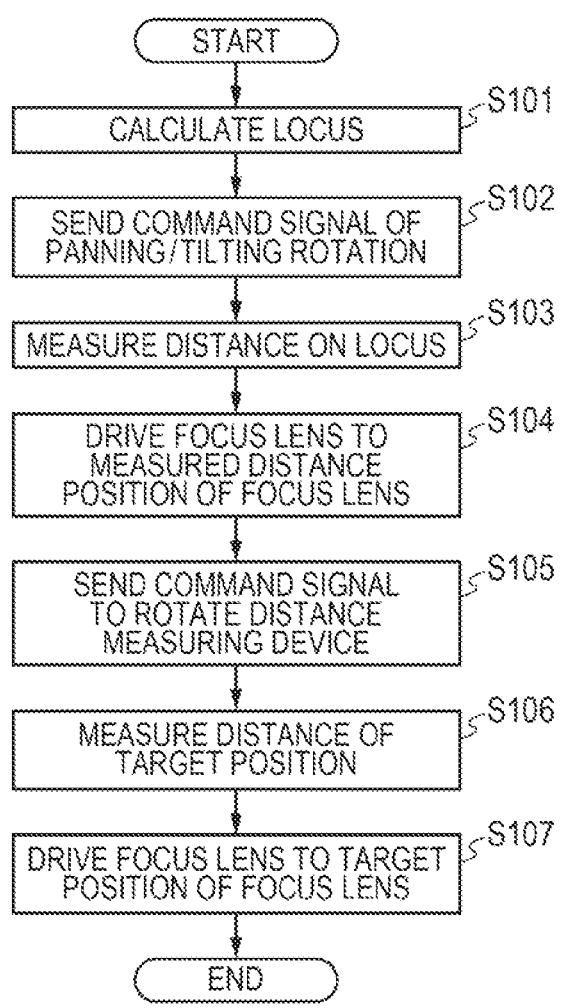
FIG. 5 is a flowchart of processing performed by a controller according to embodiment 2 of the present invention.

Hereinafter, a second embodiment of the present invention will be described with reference to FIGS. 1, 5 and 6.

For a configuration of the image pickup system according to embodiment 2, FIG. 1 should be referred to because the configuration is similar to the configuration of embodiment 1.

A case where no position command signal is input from a remote operation apparatus 14 to a controller 15 will be described. In this case, a distance measuring device drive unit 13 does not rotate for panning/tilting. When no position command signal is input, a command signal is transmitted from the controller 15 to the distance measuring device drive unit 13 to control the driving of the distance measuring device 12 so that a panning position of the distance measuring device 12 corresponds to a panning position of the image pickup unit 9. The distance measuring device 12, which includes one pair of line sensors, measures a distance to an object at fixed time intervals and outputs a measured distance value to the controller 15. The controller 15 controls autofocusing of the image pickup unit 9 based on the measured distance value.

Next, the flow of processing performed by the controller 15 will be described with reference to FIG. 5. For a supplement to the flow of processing performed by the controller 15, FIG. 6 is used. FIG. 6 illustrates a point O, which is a center of rotation of the pan drive unit 10 and the tilt drive unit 11 of the camera platform apparatus, a Y-axis, which is an axis of rotation for panning, and a X-Z plane including an X-axis and a Z-axis perpendicular to each other, which are both perpendicular to the Y axis. Here, for ease of description, during the image-pickup optical unit 5 being driven to a preset panning/tilting state (that is, the preset position with respect to panning/tilting positions), an optical axis direction of the image-pickup optical unit 5 changes within the X-Z plane. The arrow from the point O to A indicates a current (i.e., before the start of driving to the preset position) optical axis direction of the image pickup optical unit 5 at the panning/tilting positions of the image pickup optical unit 5 (hereinafter referred to as "optical axis direction A"), and the arrow from the point O to C indicates an optical axis direction of the image pickup optical unit 5 at panning/tilting target positions (i.e., the preset position with respect to the panning/tilting positions) (hereinafter referred to as "optical axis direction C"). The arrow from the point O to B indicates an optical axis direction of the image pickup optical unit 5 at a distance measuring point (panning/tilting position) of the image pickup optical unit 5 on the way (locus) of the optical axis direction changing from the optical axis direction A to the optical axis direction C (hereinafter referred to as "optical axis direction B"). Distance measuring points on a locus will be described later.

In step S101, the optical axis of the image pickup optical unit 5 is directed in the optical axis direction A, and a panning position of the image pickup optical unit 5 and a panning position of the distance measuring device 12 correspond to each other. A position command signal for panning/tilting target positions and a focus target position is input to the controller 15 from a preset function unit in the remote operation apparatus 14. The controller 15 calculates a locus of the optical axis direction of the image pickup optical unit 5 from the optical axis direction A to the optical axis direction C. In other words, a locus of a panning angle and a tilting angle (a panning position and a tilting position) relative to time is calculated. The controller 15 sets at least one distance measuring point (panning position and tilting position of the image pickup optical unit 5) where the distance measuring device 12 performs distance measurement, on the locus between the optical axis direction A and the optical axis direction B. The distance measuring point is calculated based on panning speed information, panning position information, tilting speed information and tilting position information. For example, as the locus of the optical axis direction (panning and tilting directions) of the image pickup optical unit 5 is longer and the pan drive unit 10 and/or the tilt drive unit 11 each have a lower rotation speed, a larger number of distance measuring points can be set. Meanwhile, as the locus of the optical axis direction of the image pickup optical unit 5 is shorter and the panning/tilting rotation speed is higher, a smaller number of distance measuring points can be set.

Figure 6:
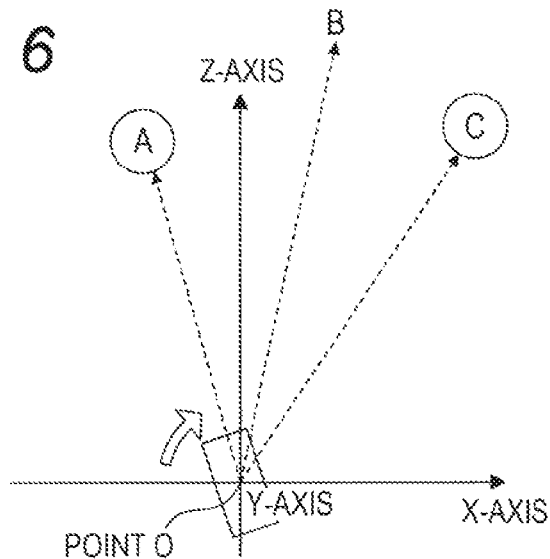
FIG. 6 illustrates a positional relationship between a camera platform apparatus and each object according to embodiment 2 of the present invention.

In embodiment 2 illustrated in FIG. 6, one distance measuring point is provided, and the measuring unit 12 measures a distance to an object in the optical axis direction of the image pickup optical unit 5 at the distance measuring point at the panning position in the distance measuring point. In step S102, the controller 15 transmits a command signal to the pan drive unit 10 and the tilt drive unit 11 based on the position command signal so that the optical axis direction of the image pickup optical unit 5 changes from the optical axis direction A to the optical axis direction C. Also, the controller 15 transmits a command signal to the distance measuring device drive unit 13 so that the panning position of the distance measuring device 12 changes from an panning direction when the optical axis direction of the image pickup optical unit is the optical axis direction A to the optical axis direction when the optical axis direction of the image pickup optical unit 5 is the optical axis direction B. At this time, the optical axis of the image pickup optical unit 5 is directed in the optical axis direction A and the panning position of the distance measuring device 12 and the panning position (panning position where the optical axis of the image pickup optical unit 5 is directed in the optical axis direction A) of the image pickup optical unit 5 correspond to each other. The processing moves to step S103.

In step S103, the direction of the optical axis of the image pickup optical unit 5 is changing from the optical axis direction A toward the optical axis direction C, but has not yet reached the optical axis direction B. Since the panning position of the distance measuring device 12 corresponds to a panning position when the optical axis of the image pickup optical unit 5 is directed in the optical axis direction B, the panning position of the distance measuring device 12 and the panning position of the image pickup optical unit 5 (whose optical axis direction has not yet reached the optical axis direction B) do not correspond to each other. The distance measuring device 12 measures a distance of an object in the optical axis direction B at the panning position where the optical axis of the image pickup optical unit 5 is directed in the optical axis direction B, and transmits a measured distance value to the controller 15, and the processing proceeds to step S104. In step S104, the optical axis direction of the image pickup optical unit 5 has not yet reached the optical axis direction B. Since the panning position of the distance measuring device 12 corresponds to the panning position when the optical axis of the image pickup optical unit 5 is directed in the optical axis direction B, the panning position of the distance measuring device 12 and the panning position of the image pickup optical unit 5 (whose optical axis direction has not yet reached the optical axis direction B) do not correspond to each other. A command signal is transmitted from the controller 15 to a focus drive unit 4 to control the driving of the focus lens unit 3 so that the focus lens unit 3 is driven to a measured distance position of the focus lens unit. The processing proceeds to step S105.

In step S105, the optical axis direction of the image pickup optical unit 5 has not yet reached the optical axis direction B. Since the panning position of the distance measuring device 12 corresponds to the panning position when the optical axis of the image pickup optical unit 5 is directed in the optical axis direction B, the panning position of the distance measuring device 12 and the panning position of the image pickup optical unit 5 (whose optical axis direction has not reached the optical axis direction B) do not correspond to each other. The controller 15 transmits a command signal to the distance measuring device drive unit 13 so that the optical axis direction of the distance measuring device 12 corresponds to the optical axis direction C.

In step S106, the optical axis of the image pickup optical unit 5 has not yet reached the optical axis direction C. Since the panning position of the distance measuring device 12 corresponds to the panning position where the optical axis of the image pickup optical unit 5 is directed in the optical axis direction C, the panning position of the distance measuring device 12 and the panning position of the image pickup optical unit 5 (whose optical axis direction has not yet reached the optical axis direction C) do not correspond to each other. The distance measuring device 12 performs distance measurement in the optical axis direction C, and transmits a measured distance value to the controller 15.

In step S107, the optical axis direction of the image pickup optical unit 5 has not yet reached the optical axis direction C. Since the panning position of the distance measuring device 12 corresponds to the panning position where the optical axis of the image pickup optical unit 5 is directed in the optical axis direction C, the panning position of the distance measuring device 12 and the panning position of the image pickup optical unit 5 (whose optical axis direction has not yet reached the optical axis direction C) do not correspond to each other. In embodiment 2, where a focus difference value is less than a threshold value, a command signal is transmitted from the controller 15 to the focus drive unit 4 to control the driving of the focus lens unit 3 so that the focus lens unit 3 is driven to the focus target position.

The processing in step S106 (distance measurement by the distance measuring device 12) only needs to be started at least before completion of the driving of the image-pickup optical unit 5 to the panning/tilting target positions. This is because, the driving of the image-pickup optical unit 5 to the panning/tilting target positions is completed after the distance measurement by the distance measuring device 12 is started, and thus, time required for the distance measurement by the distance measuring device 12 after the completion of the driving of the image-pickup optical unit 5 to the panning/tilting target positions can be reduced. Furthermore, it is more preferable that the processing in step S106 (distance measurement by the distance measuring device 12) is completed before completion of the driving of the image-pickup optical unit 5 to the panning/tilting target positions. This is because, the distance measurement by the distance measuring device 12 has already been completed when the driving of the image-pickup optical unit 5 to the panning/tilting target positions is completed, and thus, no time is required for the distance measurement by the distance measuring device 12 after the completion of the driving of the image-pickup optical unit 5 to the panning/tilting target positions.

It is favorable that the processing in step S107 (driving of the image-pickup optical unit 5 to the focus target position) has been completed before completion of the driving of the image-pickup optical unit 5 to the panning/tilting target positions. This is because, the driving of the image-pickup optical unit 5 to the measured distance position of the focus lens unit or the focus target position has already been completed when the driving of the image-pickup optical unit 5 to the panning/tilting target positions is completed, and thus, an in-focus state for an object can be obtained simultaneously with the completion of the driving of the image-pickup optical unit 5 to the panning/tilting target positions.

Although the above description has been provided taking a case where panning/tilting driving of the image-pickup optical unit 5 into a preset panning/tilting state results in change of the optical axis direction of the image-pickup optical unit 5 within the X-Z plane illustrated in FIG. 6, the present invention is not limited to this case. It should be noted that the present invention can be applied to any types of panning/tilting driving from any panning/tilting angles (panning/tilting positions) to any preset panning/titling angles (panning/tilting positions) in such a manner as described above. Further, in the embodiments 1 and 2, the image pickup system of the present invention is exemplified as that the distance measuring device (the measuring unit) is fixed on the top of the image pickup unit. However, the present invention is not limited thereto. The distance measuring device may be provided in any aspect so far as the distance measuring device can measure a distance of an object in the optical axis direction of the image pickup optical unit (the image pickup optical system). For example, the distance measuring device may be provided on the side surface of the image pickup unit.

According to the above-described configuration and flow, during the image pickup optical unit 5 being driven to preset panning/tilting positions, a distance to an object in the optical axis direction of the image pickup optical unit 5 at a panning position set on a locus of the optical axis of the image pickup optical unit 5 is measured in advance by the distance measuring device 12 to drive the focus lens unit, whereby less-burred, correct focusing on the object can be performed, enabling provision of a clear image with no feeling of strangeness. Also, a distance measuring point on the locus on which the optical axis direction changes is calculated based on panning speed information, panning position information, tilting speed information and tilting position information, and thus, a picked-up image during the image pickup optical unit 5 being driven to preset panning/tilting positions can be provided as a focused image that looks natural for viewers without excessive load being imposed on the driving of the focus lens unit 3 in the image pickup unit 9.

Although the exemplary embodiments of the present invention have been described above, the present invention is not limited to these embodiments, and various variations and alterations are possible within the scope of the spirit of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-159871, filed Jul. 21, 2011, which is hereby incorporated by reference herein in its entirety.

What is claimed is:

1. An image pickup system comprising:
    an image pickup apparatus including an image pickup optical system including a focus lens unit and a measuring unit for measuring a distance to an object or a focus state of the image pickup optical system with respect to the object;
    a camera platform apparatus which drives the image pickup optical system to pan and tilt; and
    a controller that stores a panning position and a tilting position of the image pickup optical system as preset positions, and controls the camera platform apparatus to drive the image pickup optical system to the preset positions,
    wherein upon input of a drive command for the camera platform apparatus to drive the image pickup optical system to the preset positions, the controller starts measurement by the measuring unit with respect to an object in an optical direction of the image pickup optical system at the preset positions after the input of the drive command for the camera platform apparatus to drive the image pickup optical system to the preset positions and before completion of the driving of the image pickup optical system to the preset position.

2. The image pickup system according to claim 1,
    wherein the controller stores a position of the focus lens unit as a preset position; and
    upon input of the drive command, the controller calculates a difference between a position of the focus lens unit based on a result of the measurement and the stored position of the focus lens unit, and drives the focus lens unit to the position of the focus lens unit based on the result of the measurement before the completion of the driving of the image pickup optical system to the preset position if the difference is equal to or larger than a threshold value.

3. The image pickup system according to claim 2, wherein the controller changes the stored position of the focus lens unit to the position of the focus lens unit based on the result of the measurement if the difference is equal to or greater than a threshold value.

4. The image pickup system according to claim 1, wherein upon input of the drive command, the controller calculates a locus to the preset positions from a panning position and a tilting position of the image pickup optical system before start of driving to the preset positions, sets on the locus a panning and a tilting positions, performs the measurement before the image pickup optical system passes through the panning and tilting positions set on the locus, and drives the focus lens unit to a position of the focus lens unit based on the result of the measurement.

5. The image pickup system according to claim 4, wherein a plurality of panning and tilting positions is set on the locus.

6. The image pickup system according to claim 2, wherein the controller includes a selection unit that selects either of the position of the focus lens unit based on the result of the measurement and the stored position of the focus lens unit, and upon input of the drive command, drives the focus lens unit based on the position of the focus lens unit selected by the selection unit.

7. The image pickup system according to claim 1, wherein upon input of a drive command for driving the image pickup optical system to the preset positions, the controller completes the measurement before completion of the driving of the image pickup optical system to the preset positions.

8. The image pickup system according to claim 1, wherein upon input of a drive command for driving the image pickup optical system to the preset positions, the controller completes driving of the focus lens unit to a position of the focus lens unit based on a result of the measurement before completion of the driving of the image pickup optical system to the preset positions.

9. The image pickup system according to claim 1, comprising a remote operation apparatus capable of outputting a storage command for storing panning and tilting positions of the image pickup optical system as preset positions and the drive command to the controller.

10. The image pickup system according to claim 1, wherein the measuring unit is operable independently from a pan-driving and a tilt-driving of the image pickup optical system.

11. The image pickup system according to claim 1, wherein the measuring unit is provided integrally on the image pickup optical system.

* * * * *